T. L. HARKINS.
TIRE SPREADER.
APPLICATION FILED SEPT. 30, 1919.
1,345,849.
Patented July 6, 1920.
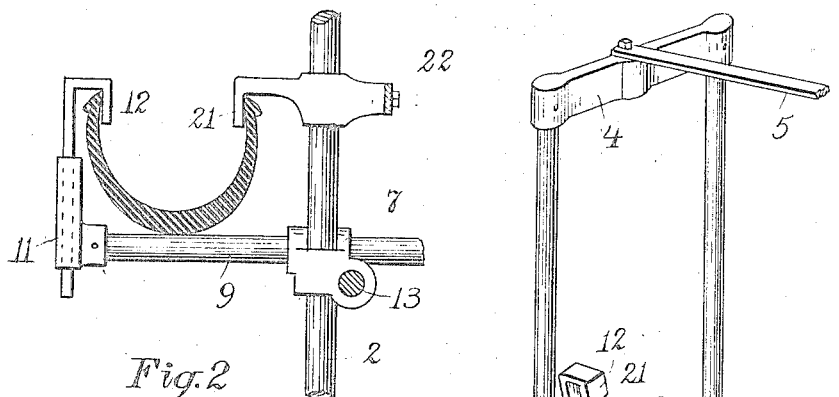
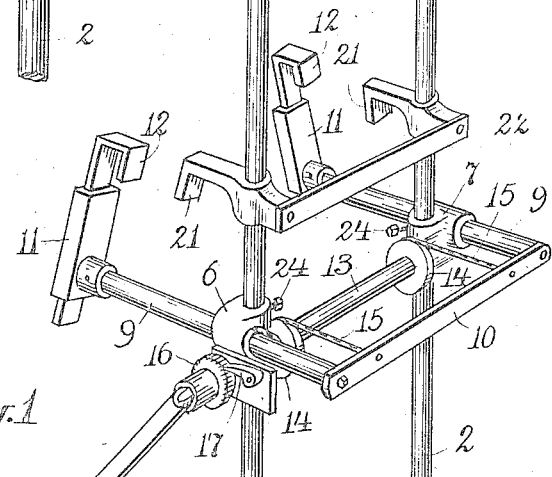
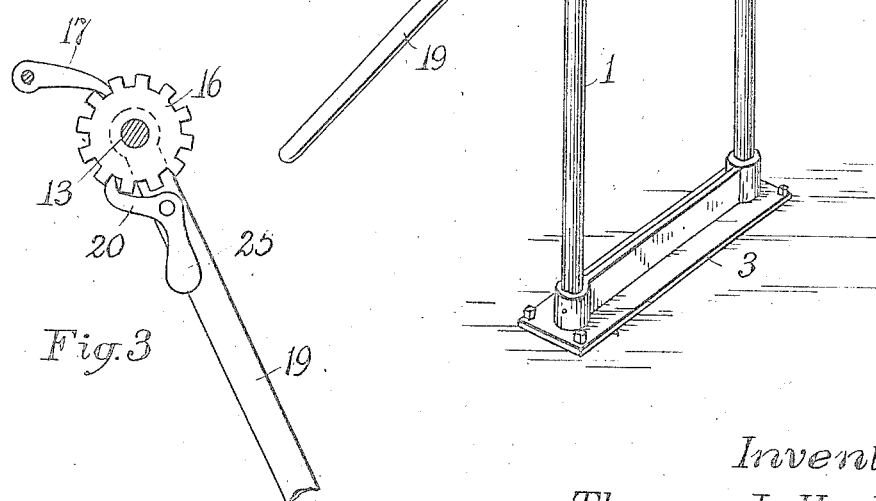
Inventor,
Thomas L. Harkins;
By A. B. Upham
Attorney.

UNITED STATES PATENT OFFICE.

THOMAS L. HARKINS, OF BOSTON, MASSACHUSETTS.

TIRE-SPREADER.

1,345,849.

Specification of Letters Patent.   Patented July 6, 1920.

Application filed September 30, 1919.  Serial No. 327,819.

*To all whom it may concern:*

Be it known that I, THOMAS L. HARKINS, a citizen of the United States, and a resident of Boston, in the county of Suffolk and Commonwealth of Massachusetts, have invented certain new and useful Improvements in Tire-Spreaders, of which the following is a full, clear, and exact specification.

The object of this invention is the construction of improved means for spreading or separating the edges of a pneumatic outer tire in order to clean and repair the inner-surface thereof.

In the drawings forming part of this specification, Figure 1 is a perspective view of a tire spreader embodying my improvements. Fig. 2 is a side sectional elevation of a part thereof. Fig. 3 is a detail sectional view of the lever arm and connections.

Referring to Fig. 1, the reference numerals 1 and 2 designate the upright of the main framework of the apparatus, the uprights being preferably held at their lower ends by a base plate 3 designed to be bolted to the floor, and at their upper ends by a cross bar 4 tied by a strap 5 to a wall or other supporting body.

Held by the uprights or posts 1, 2 are two boxes 6, 7 each slidably supporting a rod 9 connected by a bar 10, and each carrying a socket member 11 at its front end. In each socket member is a slidably removable hand 12. These rods 9 are preferably moved longitudinally within the boxes 6, 7 by means of a shaft 13 rotatable in the boxes 6, 7 and one or more wheels 14 thereon connected by chains 15 to the bar 10. A ratchet wheel 16 fixed on the shaft 13 and engaged by a pawl 17 permits the parts to be held at the desired distance away from the standards 1, 2.

For forcibly turning the shaft 13 I provide a lever arm 19 preferably connected to the shaft by a clutch, as a weighted pawl 20, as shown in Fig. 3.

Slidable upon the standards above the boxes 6, 7 are two claws 21 joined by a cross bar 22.

The operation of the spreader is as follows: The outer tire or shoe to be repaired is stood upon the rods 9, as indicated in Fig. 2, with the claws 21 somewhat elevated, and the hands or claws 12 removed from their sockets 11. Then the claws 21 are lowered and introduced within the space between the lips of the tire, and the claws 12 are slipped into their sockets and also down between the lips of the tire, the sockets and rods being pushed back far enough to permit this.

Following this, the lever arm 19 is worked up and down until the forcible winding of the chains 15 on the wheels 14 has carried the claws 12 far enough away from the claws 21 to give the spread of the tire suitable for the desired operation. When the operation upon the spread section of the tire is completed, the pawl 17 is put out of engagement with the ratchet wheel 16, and the claws and supporting parts returned to their normal positions.

Among other advantages of this tire spreader are its convenience, its support of the tire in a manner to leave it comparatively free and clear of all obstructing parts; its vertical adjustability on the standards or posts 1, 2, as by the set screws 24, whereby it is rendered capable of accommodating workers of any height, either tall or short; and its positiveness and powerfulness of action.

By providing the pawl 20 with a weighted tail 25, the pawl will release the ratchet wheel 16 when the lever arm 19 is depressed to a vertical position, thereby permitting the members 9, 11, 12 to be moved freely backward.

What I claim is:

1. A tire spreader comprising a pair of spaced posts suitably supported, claws slidable on said posts, rods horizontally and slidably supported by said posts, claws carried by said rods, and means for forcibly moving said rods to separate the last-named claws from those first mentioned.

2. A tire spreader comprising a pair of spaced vertical posts suitably supported, claws slidably supported on said posts, boxes adjustably supported on said posts, horizontal rods slidably carried by said boxes, claws supported by the front ends of said rods, and means for forcibly moving said rods to separate the latter claws from the former ones.

3. A tire spreader comprising vertically movable claws, horizontal rods slidably supported below said claws, a tie rod joining the adjacent ends of said rods, claws carried by the opposite ends of said rods, a shaft having means for its forcible rotation, a ratchet wheel mounted on said shaft, a pawl engaging said ratchet wheel for stopping its rotation in one direction, a wheel fixed on said shaft, and a chain wound upon said wheel and attached to said tie rod.

4. A tire spreader comprising claws and means for holding them, socket members and means for forcibly moving them toward and from said claws, and claws having shanks supported in said sockets.

5. A tire spreader comprising a pair of vertical posts, a base for their lower ends and a brace for their upper ends, a claw slidable on each post, a tie-rod joining said claws, a box carried by each post below said claws, a horizontal rod slidably supported by each box, a tie-rod connecting the rear ends of said rods, a socket member fixed upon the forward ends of each rod, a claw having a shank removably carried by each socket member, a shaft revolubly supported by said boxes, a lever arm for forcibly rotating said shaft, means for retaining said shaft in a predetermined position, and means operated by said shaft for forcing said rods forward.

6. A tire spreader comprising separable claws, and means for forcing them apart comprising a lever arm, a ratchet wheel mounted concentric with the pivotal center of said lever arm, and a pawl pivotally held by said lever arm to engage said wheel, the pawl being provided with a weighted tail for causing it to release the ratchet wheel when the lever arm is swung to a predetermined position.

In testimony that I claim the foregoing invention I have hereunto set my hand this 27th day of September, 1919.

THOMAS L. HARKINS.